United States Patent [19]

Ekelund

[11] Patent Number: 4,896,901

[45] Date of Patent: Jan. 30, 1990

[54] FLEXIBLE SHEET OR WEB MATERIALS

[75] Inventor: Peter Ekelund, Tunbridge Wells, England

[73] Assignee: Svecia Antiqua S.A., Fribourg, Switzerland

[21] Appl. No.: 191,117

[22] Filed: May 6, 1988

[30] Foreign Application Priority Data

May 15, 1987 [GB] United Kingdom ................ 8711568
Dec. 4, 1987 [GB] United Kingdom ................ 8728437

[51] Int. Cl.[4] ........................ B42D 15/00; B42F 5/00; G02B 27/28

[52] U.S. Cl. ........................................ 283/90; 283/70; 350/407

[58] Field of Search ........................ 283/70, 87, 88, 90, 283/91, 113; 350/162.19, 372, 377, 378, 407; 428/29, 187, 204, 311.1; 493/362, 370

[56] References Cited

U.S. PATENT DOCUMENTS

| | | | |
|---|---|---|---|
| 2,388,352 | 11/1945 | Vent | 283/90 |
| 3,313,052 | 4/1967 | Malster | 283/90 |
| 3,391,479 | 7/1968 | Buzzell et al. | 283/90 |
| 3,994,565 | 11/1976 | Van Doorn et al. | 350/407 |
| 4,123,141 | 10/1978 | Schuler | 350/407 |
| 4,186,943 | 2/1980 | Lee | 283/70 |
| 4,285,577 | 8/1981 | Schuler | 350/407 |
| 4,379,634 | 4/1983 | Rosenthal | 350/407 |

FOREIGN PATENT DOCUMENTS

| | | | |
|---|---|---|---|
| 2713880 | 7/1978 | Fed. Rep. of Germany | 281/35 |

*Primary Examiner*—Douglas D. Watts
*Assistant Examiner*—Paul M. Heyrana
*Attorney, Agent, or Firm*—Burns, Doane, Swecker & Mathis

[57] ABSTRACT

A document security article is disclosed in which a light polarizing element is contained within a flexible sheet element. A region of the light polarizing element is exposed at a window at both faces of the sheet element and optionally at a further window at one face of the sheet element. Folding the article to align the windows produces cross polarization between the exposed regions of the light polarizing element.

18 Claims, 4 Drawing Sheets

FLEXIBLE SHEET OR WEB MATERIALS

FIELD OF THE INVENTION

The present invention relates to flexible sheet or weblike materials, and includes in particular valuable documents (e.g. security documents). In preferred embodiments the invention relates to sheet or weblike materials provided with a mark of legitimacy or authenticity which normally is not visible but which can be made visible with the help of external means for checking the authenticity of the material.

BACKGROUND OF THE INVENTION

It is known that valuable documents, e.g. bank-notes, identity cards, pass-ports etc. can be provided with invisible marks which can be made visible with the help of external means or visible marks which change in visual character under some externally applied condition. It is known, for example, that on identity documents a marking of legitimacy or of authenticity may be fixed which is of phosphorescent "colour" or material which can be made visible through illumination with UV-light. In such a manner any type of text and markings such as numerical series, names etc. can be introduced. It is an inconvenience to check of marking of legitimacy in that it requires special auxiliary means in order to make the marking visible, and to carry out a check of legitimacy it is necessary therefore, to have access to, or to call on, such equipment. It is also known that parts of a document can be magnetized and the documents be provided with a code of legitimacy produced by magnetic means. In this case too, access to a relatively complicated apparatus is required in order to establish the presence and significance of the magnetic markings.

Thus there is clear need for a simpler mark of legitimacy or authenticity which may be detected without the use of special machinery.

OBJECTS AND SUMMARY OF THE INVENTION

The present invention provides a flexible sheet or web having a light polarizing security element, e.g. of light-polarizing plastics film, contained within the thickness of the sheet or web wherein a region of the security element is exposed in a window at both faces of the sheet or web.

The sheet or web may include two material layers laminated to each other by means of a binder layer, which may be said light polarising film.

Since the heating involved in lamination will generally destroy the light polarizing effect of a plastics film, at least when this is due to the film having been oriented by stretching, care may be needed to ensure that the binder layer film is not heated in the area of said windows. Preferably, one of the material layers has at least two apertures therein exposing parts of the film towards one side of the sheet or web, and the other material layer has at least one aperture exposing a part of the film towards the other side of the sheet or web, the or each said aperture in the said other material layer being at least partially coincident with one of the apertures in said one material layer, and the film being so arranged that the parts thereof exposed through the two said apertures in said one material layer have axes of polarisation mutually at least substantially at right angles on folding the sheet or web so as to bring together the two said apertures in said one material layer.

The film may be oriented so that its axis of polarisation forms an angle of approximately 45° with an imaginary line joining the said two apertures in the one material layer. The film may be oriented so that its axis of polarisation forms an angle of approximately 45° with edges of the sheet or web.

The apertures in said one material layer may be located on an imaginary line running perpendicular to an edge of the sheet or weblike material.

The security element may be separate from the binder layer and may be laminated between said material layers by said binder layer.

As stated above, the security element is exposed in a window on both faces of the sheet or web. Said security element may be exposed on at least one face of the sheet or web at a second window or a second security element may be provided exposed on at least one face of the sheet at a second window.

Preferably, then, the axes of polarisation of the security elements or portions of the security element exposed in said windows are parallel and lie at approximately 45° to an imaginary line joining the said windows.

The security element may be an elongate strip or thread of film.

The security element may have been introduced into the sheet or web by laying down sheet or web forming fibres, or particles, over said security element. Methods of incorporating security devices into fibrous sheets and webs in this way are disclosed in EP-B-0059056.

The security element may be caused to be exposed at one or both faces of the sheet or web during deposition of said fibres or particles by locally varying the pattern of said deposition.

Alternatively, said security element may be exposed at one face of the sheet or web during deposition of said fibres or particles by locally varying the pattern of said deposition and thereafter, web material may be removed from the other face selectively at one or more window locations to expose the security element on said other face of the sheet or web.

In a further variant, said security element is initially contained entirely within the sheet or web and is exposed at both faces of the sheet or web by removing web material selectively from one face at at least two locations to expose the security element and by removing web material selectively from the other face at at least one said location to expose the security element.

Methods of removing sheet material to expose a buried security element are disclosed in GB-A-1552853. Preferably, said web material is selectively removed by abrasion of the sheet or web by an abrasion member.

The polarizing film may be a stretched film of polyvinyl alcohol. A part of the film exposed at a window on at least one face of the sheet or web may have an at least partially light reflecting material applied thereto so as to form a light checking mark prominent against a dark background on viewing the same through a window in which the film is exposed at both faces of the sheet or web.

The sheet or web material may be covered by liquid-tight films of transparent plastics sealed to each face of the sheet or web.

The invention includes a method of producing a sheet or web containing a light polarizing security element selectively exposed at each face of the sheet or web, which method comprises taking a sheet or web containing at least one light polarizing film security element in the thickness of the sheet or web and removing the sheet or web material from one face thereof at least two selected locations to form windows exposing the security element or elements, and removing the sheet or web material from the other face thereof at at least one of said selected locations to form a window exposing the security element, wherein said locations are selected such that the areas of the security element exposed at the windows have axes of polarization mutually at least substantially at right angles when the sheet or web is folded so that the windows overlie one another.

The invention further includes a method of producing a sheet or web containing a light polarizing security element selectively exposed at each face of the sheet or web, which method comprises taking a sheet or web containing a light polarizing security element in the thickness of the sheet or web but exposed at one face of the sheet or web at at least one window therein, and removing sheet or web material from the other face of the sheet or web at a location coincident with said window location to expose the security element at a window on the other face of the sheet or web, wherein at least two said windows are formed on the one or the other face of the web and wherein said two window locations are selected such that the areas of security element exposed at the windows have axes of polarization mutually at least substantially at right angles when the sheet or web is folded so that the windows overlie one another. The removal of sheet or web material is preferably carried out by abrasion, more particularly by rotating an abrasion member against said sheet or web while supporting the sheet or web on a support member.

The support member is preferably a roller having one or more raised areas thereon and forming a nip with said abrasion member, and said sheet or web is passed through said nip by rotation of said roller such that abrasion of the sheet or web occurs when said raised areas of the roller are under the nip.

Means may be provided for monitoring the position of the desired abrasion locations on the sheet or web laterally of said support roller and said abrasion member may be shifted laterally to maintain it in position to abrade said desired abrasion locations despite variation of the lateral position of said locations.

The means may for instance track the lateral position of a security thread buried wholly, partially or intermittently in the sheet or web.

The invention further includes a method of producing a sheet or web containing a light polarising security element selectively exposed at each face of the sheet or web, which method comprises laminating two sheet or web layers to one another by means of an intermediate binder layer of plastics, wherein:

(a) the binder layer, prior to said laminating, is a light polarizing film;

(b) a first of the sheet or web layers has at least two apertures therein;

(c) a second of the sheet or web layers has at least one aperture therein;

(d) the at least one aperture of the second layer is arranged to overlie an aperture of the first layer; and (e) the light polarizing film is heated to laminate the layers together but the light polarizing film is not heated to a degree sufficient to destroy its light polarizing property in the region of said apertures during laminating the layers together.

The invention further includes a method of producing a sheet or web containing a light polarizing security element selectively exposed at each face of the sheet or web, which method comprises laminating two sheet or web layers to one another by means of an intermediate binder layer of plastics, wherein:

(a) a security element of light polarizing film is inserted between the layers before lamination;

(b) a first of the sheet or web layers has at least two apertures therein overlying said security element;

(c) a second of the sheet or web layers has at least one aperture therein overlying the security element;

(d) the at least one aperture of the second layer is arranged to overlie an aperture of the first layer; and (e) the intermedidate layer of plastics film is heated to laminate the layers together but the security element is not heated to a degree sufficient to destroy its light polarizing property in the region of the apertures during laminating said layers together.

The invention will be illustrated by the following description of preferred embodiments with special reference to the attached drawings, wherein:

DESCRIPTION OF THE INVENTION

DETAILED DESCRIPTION OF THE PREFERRED EMBODIMENTS

Figure 1:
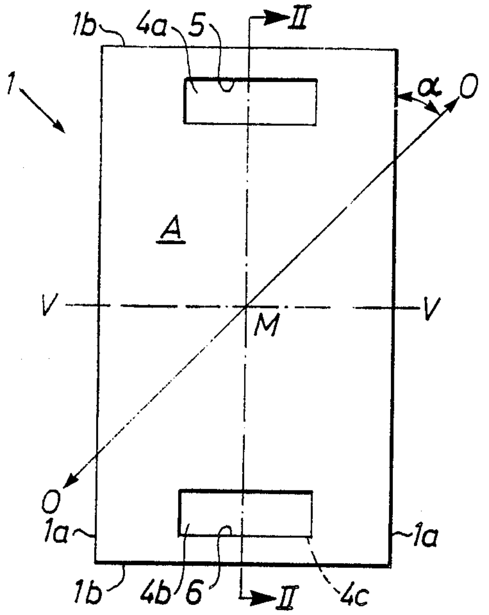
FIG. 1 shows one side of a sheet material in accordance with a first preferred embodiment of the invention.
Figure 2:
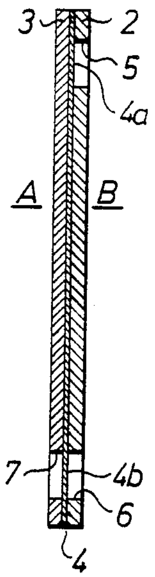
FIG. 2 is a slightly enlarged sectional view along II—II in FIG. 1.

In FIG. 1 there is shown a plane, foldable sheetlike material in accordance with a first embodiment of the invention. In accordance with FIG. 2 the sheet 1 comprises two outer material layers 2 and 3 and a laminated binder layer 4 of plastics. When the sheetlike material 1 is intended as a valuable document, e.g. a bank note, share or similar paper of value, the outer material layers 2 and 3 preferably can consist of some material capable of being written on or printed on, e.g. paper or plastics, upon which patterns, written characters, numerical series etc. (not shown) customary for such documents can be printed. The binder layer 4 preferably consists of a thin, at least partly transparent or translucent, plastics film with the capacity of polarizing transmitted light. An example of such a plastics material, which has proved to function well according to the invention, is polyvinyl alcohol (PVOH), oriented by stretching. The outer layer 3 is manufactured from a transparent material.

The outer layers 2, 3 and the binder layer 4 are assembled together and heated, except in the region of the holes or cutouts 5, 6 and 7 next described. Heating destroys the light polarising properties of the oriented binder layer film.

One of the two outer material layers 2 has two holes or cutouts 5 and 6 through which corresponding parts 4*a* and 4*b* respectively of the plastics film are exposed towards the one side A of the sheetlike material 1. The other one of the outer material layers 3 has a corresponding hole or cutout 7, which in the example shown is located right opposite one of the cutouts 6 in the material layer 2, to expose a corresponding part of plastics film 4*c* (which in the present example wholly coincides with the part of plastic film 4*b* exposed through the cutout 6) towards the other side B of the sheetlike material 1.

The platic film 4 between the two outer material layers 2 and 3 in the example chosen here is oriented so that its axis of polarization of the plane or unfolded material 1 in FIG. 1 substantially coincides with the direction of the double-headed arrow O—O which intersects the longitudinal edges 1*a* of the material 1 at an angle alpha equal to 45°. In the example shown it is further assumed that the cutouts 5, 6 and 7 respectively are located symmetrically about an imaginary folding line V—V through the centre M of the sheet 1 parallel with the short sides 1*b* of the sheet 1.

Figure 3:
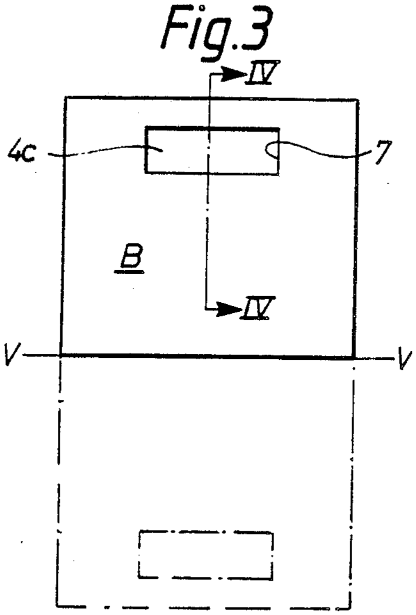
FIG. 3 shows the sheet material folded in half.
Figure 4:
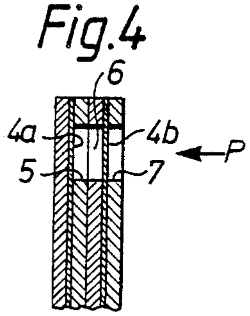
FIG. 4 is a slightly enlarged sectional view along IV—IV in FIG. 3.

When the sheet 1 is thus doubled along the folding line V—V with one outer material layer 2 facing inwards, to assume the doubled position shown in FIG. 3, the cutouts 5, 6 and 7 will coincide with each other owing to their symmetrical location, with the parts of plastics film 4*a* and 4*b* overlapping each other within the area of the coinciding cutouts, as shown in FIG. 4. Owing to the orientation of the plastics film, moreover, the overlapping parts of the plastics film 4*a* and 4*b* will have axes of polarization intersecting one another at right angles or substantially at right angles. On viewing, through the so doubled sheet 1 in the direction of the arrow P in FIG. 4 a dark spot 8 (FIG. 5) serving as a checking mark in accordance with the invention presents itself owing to the total or practically total extinction of the light which falls upon the overlapping parts of plastics film 4*b* and 4*a* through the transparent outer layer 3.

Figure 6:
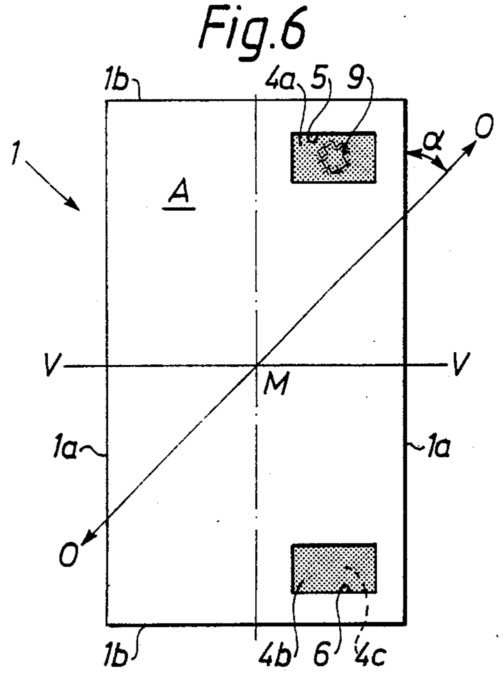
FIG. 6 shows one side of a sheet material in accordance with a second preferred embodiment of the invention.
Figure 7:
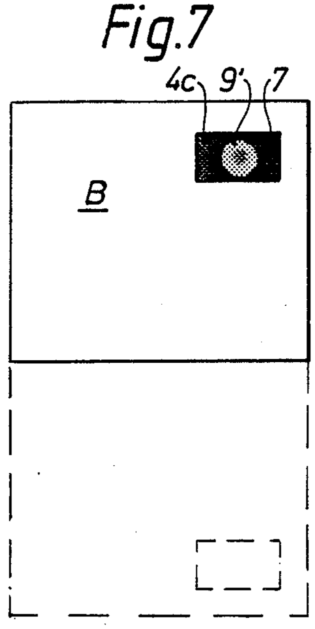
FIG. 7 shows the sheet material of FIG. 6 folded in half.

FIGS. 6 and 7 show a sheetlike material in accordance with another embodiment of the invention, and for the sake of clarity the same reference designations as in the preceding Figures have been used in these two Figures for identical or similar details. Thus this sheet too comprises a thin plastic film laminated between two outer material layers with the capacity of polarizing light, and similar to the previous sheet, the plastics film is oriented so that its axis of polarization coincides with a line O—O which intersects the longitudinal edges 1*a* of the sheet 1 at an angle alpha equal to 45°. One of the two outer material layers (which forms one side A of the sheet 1) has two cutouts 5 and 6 arranged symmetrically about an imaginary folding line V—V parallel with the short sides 1*b* of the sheet 1 at right angles through the centre M of the sheet, through which parts 4*a* and 4*b* respectively of the plastics film are exposed towards one side A of the sheet. The other outer material layer which is facing towards the other side B of the sheet, partly shown in FIG. 7, has a corresponding cutout 7 located right opposite the cutout 6 so as to expose a part of plastics film 4*c* which in the example shown here wholly coincides with the part of plastics film 4*b* exposed through the cutout 6 in the first mentioned outer material layer.

The sheet 1 according to the embodiment of the invention shown in FIGS. 6 and 7 differs from the sheet described earlier in that the exposed part of plastics film 4*a* within the area of the cutout 5 towards one side A of the sheet 1 is printed, or is covered in some other suitable manner, with an at least partly reflecting material so as to form a checking symbol 9 in the form of a text, numerical series, figure or some other suitable checking symbol. For the sake of simplicity such a symbol has been indicated by a dark-coloured "0" in FIG. 6.

When the plane sheet 1 in FIG. 6 is doubled along the folding line V—V with one side A of the sheet facing inwards to assume the doubled position shown in FIG. 7, the overlapping parts of plastics film 4*a* and 4*b* (=4*c*), precisely as before, will present prominent dark portions because of light extinction in the areas outside the portions which have been printed, or covered, with the reflecting material, whilst the portions of the parts of film 4*a* covered with material will appear equally clearly as conspicuously light portions 9′ corresponding to the symbol 9 against the dark surroundings.

A flexible, weblike material provided with checking marks of the abovementioned type, apparent on viewing, can be produced in accordance with the the invention in a manner known by itself through lamination of material webs included in the material which are brought together and passed through a nip between rotating rollers which, while heat is supplied, compress the material webs so that a fusing together of the surfaces of the outer material layers provided with holes and the intermediate polarizing plastics layer serving as a binder layer is achieved. Naturally it will normally be ensured that the two outer material webs are brought together synchronously, so that the respective holes in the outer material webs end up right opposite each other so as to make possible a checking mark of the type described above in accordance with the invention. However, overlap rather than exact coincidence of the apertures may be acceptable.

The cutouts 5, 6 and 7 and the exposed parts of the plastics film may be so designed that they naturally fit in such a way as to be concealed by printed patterns, such as figures, texts, numbers combinations etc., on the outsides (A and B respectively) of the two outer material layers.

Figure 8:
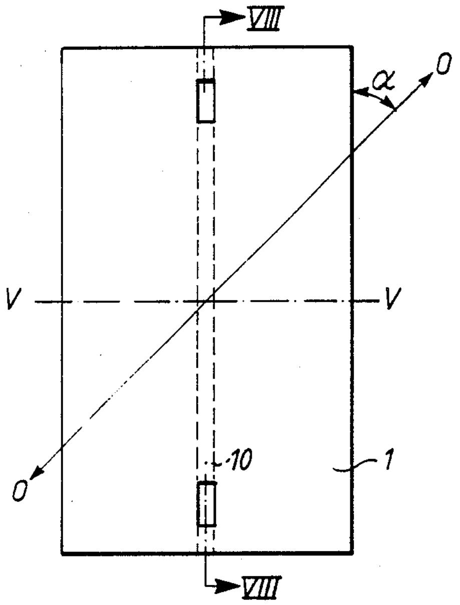
FIG. 8 shows a sheet according to a further embodiment according to the invention.
Figure 9:
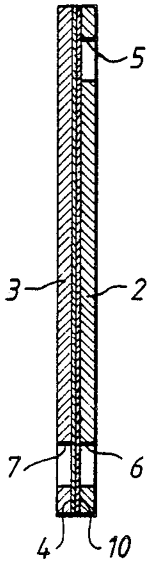
FIG. 9 shows a cross-section on the line VIII—VIII of FIG. 8.

In the embodiment of illustrated in FIG. 8, a sheet 1 comprises outer material layers 2 and 3 laminated to one another by a binder layer 4 of plastics. A security element in the form of a narrow strip of light polarising plastics film 10 runs along the centre line of the sheet. Apertures 5, 6 and 7 are provided as in the embodiment of FIG. 1, but are, in this case, small, narrow apertures elongate in the direction of extension of the strip 10. In manufacture, the plies of the laminate sheets are brought together, with the strip 10 being simultaneously fed in to form an assembly of plies containing the strip, and the assembly is then heated to bond the two outer layers together. Heating is avoided in the region of the apertures 5, 6 and 7 so as to avoid destroying the light polarising properties of the strip 10 in those regions. The strip 10 may be a strip of plastics film similar to that described as the binder layer 4 in FIG. 1.

The direction of polarization of the strip 10 lies at an angle alpha, preferably 45°, to the direction of extension of the strip as indicated by the line O—O in FIG. 8. Accordingly, when the sheet is folded about the line V—V, the windows 7, 6 are superimposed over the window 5 and the angles of polarisation of the strip 10 in the windows 7, 6 and 5 respectively lie at right angles to one another. As before indicia may be provided on the strip 10 which show up under such cross-polarization or which are normally visible or disappear under such cross-polarization.

In a yet further embodiment according to the invention, a strip of polarising plastics film is introduced during paper manufature into the thickness of a web of fibrous material such as paper, as is conventionally done with security threads in bank note paper, the plastics strip lying entirely within the thickness of the body of the paper. In subsequent processing steps, paper material is abraded from each surface of the web in areas overlying the plastics strip to form windows through which the strip is visible.

United Kingdom patent specification No. 2172550 describes a method for manufacturing a sheet or web material provided with a watermark-like pattern which comprises working off material, for example, by grinding or milling by pressing the sheet or web material against a rapidly rotating grinding or cutting roller with a support having a raised relief corresponding to the desired pattern. Such a method may be adapted to produce windows revealing a thread buried within the body of the paper.

Figure 10:
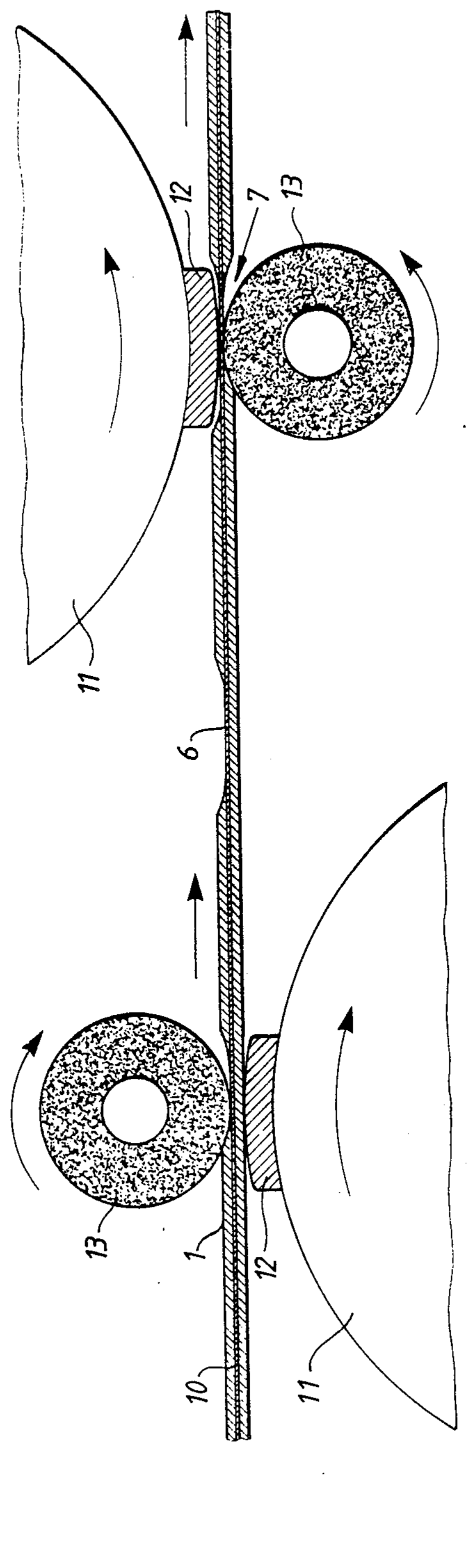
FIG. 10 is a schematic side elevation of apparatus for producing a paper web in accordance with a further embodiment according to the invention.

Thus, as shown in FIG. 10, a paper web 1 containing a buried security thread 10 in the form of a strip of light polarizing plastics film, passes through a first work station at which it is carried over the surface of a rotating support roller 11 having at spaced intervals on the surface thereof, raised relief members 12. Raised relief members 12 are spaced round the periphery of the support roller 11 at distances corresponding to the separation desired between successive windows in the final product. Forming a nip with the support roller 11 is an abrading roller 13 having an abrasive surface and rotating in the opposite direction to support roller 11. Where the paper is raised on the reliefs 12, it is abraded by the roller 13 to remove paper fibres lying on one side of the security thread 10 so as to form a window 6 in which the security thread 10 is revealed on one side of the web. The web then passes to a second work station at which a similar pair of rollers 11 and 13 form a second nip through which the web passes. In the second work station, however, the rollers 11 and 13 respectively are located on opposite sides of the web compared to the first work station. The two work stations are synchronised so that grinding of the web occurs in the second work station in the area of the windows 6 to remove web material from the other side of the web to form a second window 7 revealing the security thread 10 on the other side of the web. The web produced by this process has a buried security thread exposed on each side of the web at a series of spaced windows 6, 7. The orientation of the polarization of the security thread will be as shown in FIG. 8.

Figure 5:
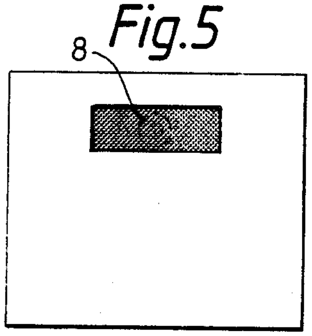
FIG. 5 is a side view of FIG. 4.

In a modification of the process described above with reference to FIG. 10, the starting paper web may be generally as illustrated in FIG. 5 of European patent specification No. 0059056, having been produced by the process described in that specification. Such a web has a security thread buried in the thickness of the paper during the course of manufacture but exposed on one side of the web at a series of windows. A web of that kind may be treated in a single work station of the kind shown in FIG. 10 to abrade material at window locations from the opposite side of the web from the initially existing windows so as to form windows in which the security thread is visible from both sides of the web. The operation of the abrasion apparatus must be synchronised to the pre-existing locations of the windows on the first side of the web. Also, security threads put in place by the method taught with reference to FIG. 5 of Specification No. 0059056 tend not to be positioned laterally of the web particularly uniformly and it may therefore be necessary to track the lateral position of the security thread in the web and shift the abrasion roller 13 laterally of the web, (i.e. at right angles to the plane of FIG. 10).

Finally, Specification No. 0059056 teaches with reference to FIG. *6b*, the provision of a security thread buried in the thickness of a paper web but exposed during manufacture of the web and windows on both sides of the web. Such a process may be applied using a polarising thread of the kind described herein to produce a product according to the present invention.

As illustrated above, the invention provides a sheet or web material for security documents which includes a mark of authenticity which is simple to apply and simple to detect and which cannot be effaced or altered.

While this invention has been illustrated and described in several preferred embodiments, it is recognized that variations and changes may be made without departing from the invention as set forth in the claims.

What is claimed is:

1. A document security article comprising:

a flexible sheet element having opposite faces; and a light polarizing element positioned within said sheet element between said opposite faces, said sheet element including two material layers with said light polarizing element being located between said material layers, a first one of the material layers having at least two apertures therein exposing portions of the light polarizing element towards one face of the sheet element and a second one of the material layers having at least one aperture therein exposing a portion of the light polarizing element towards the other face of the sheet element, the at least one aperture in the second material layer being at least partially coincident with one of the apertures in said first material layer, and the light polarizing element being so arranged that the portions thereof which are exposed through said two apertures in said first material layer have axes of polarization which are at substantially right angles with respect to each other when the flexible sheet element is folded so as to bring together the two apertures in said first material layer.

2. The document security article according to claim 1, wherein said light polarizing element comprises a film.

3. The document security article according to claim 1, wherein the film is oriented to that its axis of polarization forms an angle of approximately 45° with an imaginary line joining the two apertures in said first material layer.

4. The document security article according to claim 1, wherein the film is oriented so that its axis of polarization forms an angle of approximately 45° with edges of said sheet element.

5. The document security article according to claim 4, wherein the apertures in said first material layer are located on an imaginary line extending perpendicular to an edge of the sheet element.

6. The document security article according to claim 1, wherein said light polarizing element is laminated between said material layers by a binder layer.

7. The document security article according to claim 6, wherein said light polarizing element is exposed on at least one face of the sheet element through another aperture.

8. The document security article according to claim 7, wherein the axes of polarization of the portions of said light polarizing elements exposed through said apertures are parallel and lie approximately at 45° to an imaginary line joining said apertures.

9. The document security article according to claim 6, wherein an additional light polarizing element is provided and is exposed on at least one face of the sheet element through an additional aperture.

10. The document security article according to claim 9, wherein the axes of polarization of the light polarizing elements are parallel and lie approximately 45° to an imaginary line joining said apertures.

11. The document security article according to claim 6, wherein said light polarizing element is an elongated strip or thread of film.

12. The document security article according to claim 1, wherein said light polarizing element comprises a film, a portion of said film exposed through said aperture having an at least partially light reflective material applied thereto so as to form a light checking mark which is prominent against a dark background when the film is viewed through the aperture on which the film is exposed at both faces of said sheet element.

13. A method of producing a document security article comprising the steps of:

providing a laminated sheet material having an inner layer of light polarizing material and outer layers of flexible material with exposed outer faces, removing said flexible material from one face thereof at at least two selected locations to form windows exposing the said light polarizing material, removing said flexible material from the other face thereof at one of said selected locations to form a window exposing said light polarizing material; and providing a folding axis for said light polarizing material and said flexible material so that the windows overlie one another with the axis of polarization of the light polarizing material at one selected location being at substantially right angles with respect to the axis of polarization of the light polarizing material at the other selected location when the laminated sheet material is folded along said folding axis.

14. A method according to claim 13, wherein the step of removing flexible material is performed by abrasion.

15. The method according to claim 14, wherein said abrasion is performed by rotating an abrasion member against the flexible material while the flexible material is supported on a supporting member.

16. The method according to claim 15, wherein said support member comprises a roller having at least one raised area thereon for forming a nip with said abrasion member, said flexible material being passed through said nip by rotation of said roller such that abrasion of the flexible material occurs when said at least one raised area is positioned under the abrasion member.

17. The method according to claim 16, wherein means for monitoring the position of the desired abrasion locations on the flexible material laterally of said support roller is provided, said abrasion member being shifted laterally to maintain the abrasion member in position to abrade the flexible material at said desired abrasion locations.

18. The method of producing a document security article comprising the steps of:

laminating one sheet of flexible material having at least two apertures therein to a second sheet of flexible material having at least one aperture therein through an intermediate binder layer of plastics which, prior to said laminating step, comprises a light polarizing film, said laminating step including laminating said one sheet of flexible material to said second sheet of flexible material so that an aperture in said one sheet of flexible material overlies said at least one aperture in the second sheet of flexible material, said laminating step further comprising the step of heating the light polarizing film so as to laminate said binder layer and said first and second sheets of flexible material together, said light polarizing film being heated to a degree that will not result in destruction of its light polarizing property in the region of said apertures.

* * * * *